B. SLUSSER.
Sulky-Plow.
No. 6,563. Reissued July 27, 1875.
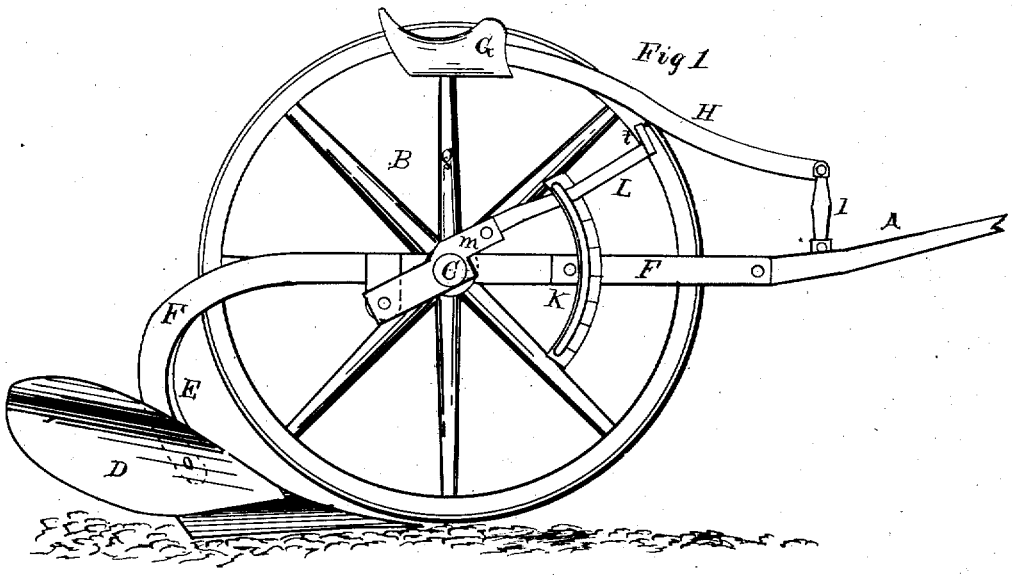
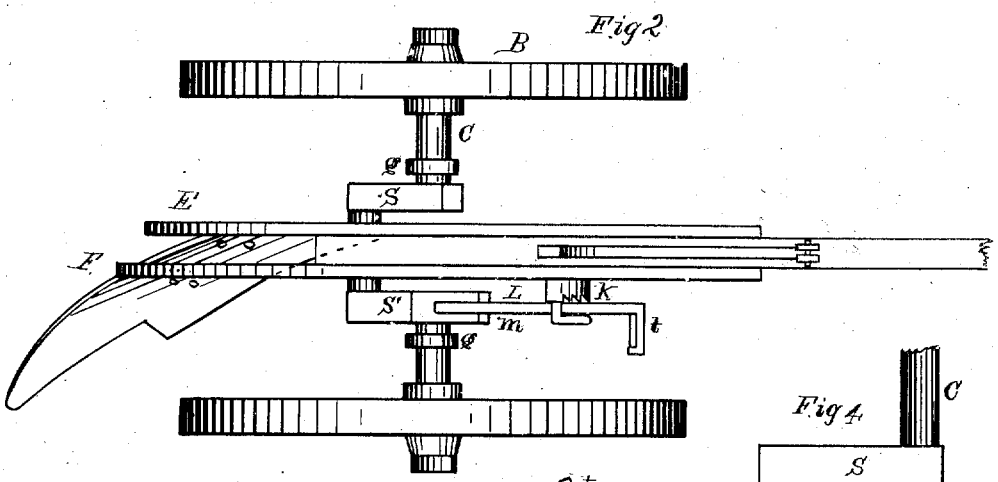
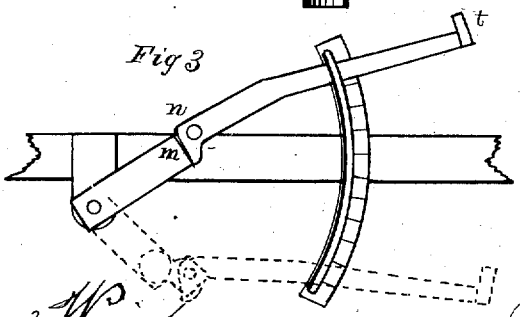
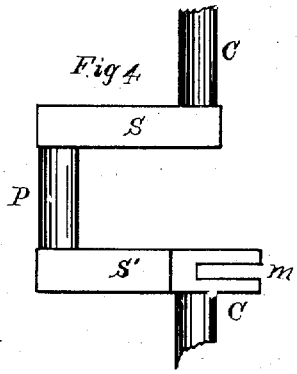
Attest
Luna Wright
Caleb Elliott.
Inventor
Benjamin Slusser
By T. P. Hunt & Co
Attys

UNITED STATES PATENT OFFICE

BENJAMIN SLUSSER, OF SIDNEY, OHIO, ASSIGNOR TO NORMAN DU BOIS AND A. F. KOOP.

IMPROVEMENT IN SULKY-PLOWS.

Specification forming part of Letters Patent No. 80,427, dated July 28, 1868; reissue No. 6,563, dated July 27, 1875; application filed April 17, 1875.

*To all whom it may concern:*

Be it known that I, BENJAMIN SLUSSER, of Sidney, county of Shelby and State of Ohio, have invented certain Improvements in Sulky-Plows, of which the following is a specification:

My invention relates to that class of plows denominated sulky-plows, or plows supported upon wheels, and provided with a seat for the driver.

The object of this invention is to simplify the construction of sulky-plows, so as to reduce their cost, enable them to be easily operated, readily adjusted, and to yield to immovable obstacles without breaking, the latter being accomplished by means of a double crank-axle, which allows the plow to rise and free itself from an obstruction, and, after passing such obstruction, to fall back into position automatically. It also consists in an extension of one of the arms of the crank-axle, and a foot-lever attached to this extension for the purpose of raising, lowering, or throwing the plow out of the ground at will by the foot of the driver, and at the same time allowing the whole to operate automatically in permitting the plow to rise out of the ground and return to its work in case it meets with a hidden obstruction, as hereinafter more fully described.

Figure 1 is an elevation of the right side, the right wheel being removed. Fig. 2 is a plan, the seat being removed. Fig. 3 is a section of the right axle-crank, showing the adjacent parts in elevation, and exhibiting the construction and operation of the devices for lifting and adjusting the plow. Fig. 4 is a plan view of the double crank-axle, and showing the extension *m* of the arm S′ for the purpose of attaching a lever to operate said crank-axle.

A is the draft-pole; B B, the draft-wheels; C C, the axle-tree, which is provided with a double crank, S S′, at its center; and E F, beams or standards, one attached to each side of the draft-pole, and extending from its rear end back, then down, and then, at their lower ends, slightly forward, where they are bolted alongside of each other to the rear side of the mold-board, near its forward edge, supporting it in the manner clearly shown in Figs. 1 and 2. G is the driver's seat, supported upon arched standards *g g*, which are pivoted to the axle just outside of the arms S S′ of the crank-axle, and steadied in its position by a rod, H, which extends forward from the top of the standards *g g*, and is hinged to a short vertical post, I, which itself is hinged to the upper side of the pole A, so that, as the crank S S′ rises or falls, the seat G always maintains its proper position, the movement of the post I corresponding to the movement of the crank. From the forward or inner extremity of one of the crank-arms S′ a projection, *m*, extends forward beyond the line of the axle C, and has a lever, L, hinged to it, and extending forward, terminating in a foot-rest, *t*, and working in a ratchet-guide, K, by which it can be confined at any elevation, and which causes it to travel up and down in a vertical path. The lever has a shoulder, *n*, which sets against the square end of the projection *m* when the lever handle is thrown down, and thus forces the part *m* down with the lever, and throws the portion of the crank P up, elevating the rear end of the pole A, which is supported upon this crank-pin P, and thus raising the plow out of the ground. On the other hand, there is nothing in the nature of the joint by which the lever is hinged to the part *m* to prevent the rear end of the crank from being thrown up without raising the lever, as shown by the dotted lines of Fig. 3. Thus, when the forward end of the lever is fastened down by the rack K, if the plow should strike an immovable obstacle, it will rise, throwing up the crank without detaching the lever from its notch in the rack, and again, when the obstacle has been passed, dropping to its proper position. The device thus works easily and automatically without danger of breaking, all of which is accomplished by the simple means of a crank-axle, the rearward portion P being attached directly to the standards E F, to which the plow is attached. By this construction of the crank-axle, having the rearward crank-pin loosely pivoted immediately to the beam or frame of the plow, whenever the share encounters any obstacle the crank-pin rises automatically with the plow, and throws the draft upon the wheels, the hubs of which being the center of motion the plow is still effectually maintained in an upright position by its connection with the axle. This crank-axle is clearly shown in the detached view, Fig. 4, where the part or lug *m* forms an extension to the part S′ of the crank-axle, and enables me to move the rearward portion P of the crank-axle up or down at will through the means of the lug or projection *m* and lever L. Its simplicity of construction enables it to be made very light, so that it can be handled easily under all circumstances.

Having thus fully described my invention, what I claim, and desire to secure by Letters Patent, is—

1. The combination of the crank-axle S S′ P and jointed bent lever L *n*, for the purpose of raising the plow, and permitting it to rise automatically out of the ground, substantially as and for the purpose set forth.

2. The combination of the crank-axle S S′ P of a sulky-plow with the beam or frame of the plow, loosely pivoted thereto, to permit the plow to rise automatically out of the ground, substantially as and for the purpose described.

BENJAMIN SLUSSER.

Witnesses :
J. S. HARVEY,
AD. HERETH.